(12) United States Patent
Canright et al.

(10) Patent No.: US 7,881,227 B2
(45) Date of Patent: *Feb. 1, 2011

(54) METHODS FOR SPREADING OR PREVENTING SPREADING OF INFORMATION IN A NETWORK

(75) Inventors: Geoffrey Canright, Oslo (NO); Kenth Engø-Monsen, Fredrikstad (NO)

(73) Assignee: Telenor ASA, Fornebu (NO)

( * ) Notice: Subject to any disclaimer, the term of this patent is extended or adjusted under 35 U.S.C. 154(b) by 0 days.

This patent is subject to a terminal disclaimer.

(21) Appl. No.: 11/988,370

(22) PCT Filed: Jul. 6, 2007

(86) PCT No.: PCT/NO2006/000259

§ 371 (c)(1),
(2), (4) Date: Nov. 18, 2008

(87) PCT Pub. No.: WO2007/008078

PCT Pub. Date: Jan. 18, 2007

(65) Prior Publication Data

US 2009/0141652 A1     Jun. 4, 2009

(30) Foreign Application Priority Data

Jul. 7, 2005    (NO)  ................................. 20053330

(51) Int. Cl.
*H04L 12/28*    (2006.01)
*G06F 15/16*    (2006.01)

(52) U.S. Cl. ...................................... 370/254; 709/230
(58) Field of Classification Search .................. 370/254; 709/230

See application file for complete search history.

(56) References Cited

U.S. PATENT DOCUMENTS

2007/0168533 A1*   7/2007   Canright et al. ............. 709/230

OTHER PUBLICATIONS

International Preliminary Report on Patentability and Written Opinion of the International Searching Authority, issued in corresponding International Patent Application No. PCT/NO2006/000259, dated on Jul. 7, 2005.
Canright, G., et al., "Epidemci spreading over networks—A view from neighbourhoods", Telektronikk, Apr. 2005, vol. 1.

(Continued)

*Primary Examiner*—Ayaz R Sheikh
*Assistant Examiner*—Tarell Hampton
(74) *Attorney, Agent, or Firm*—McDermott Will & Emery LLP (57) ABSTRACT

A method for improved spreading of information in a network is described, together with corresponding methods with the opposite aim, namely to hinder the spreading of harmful information in a network. The harmful information may be (for example) a data virus. The first method includes as its characterizing feature to connect at least one node of high Eigenvector Centrality Index in a first region with at least one node of high Eigenvector Centrality Index in a second region. These connections may be made using direct links, or with the help of a new node lying between the nodes to be connected. One method for preventing spreading of information or physical traffic in a network may include as its characterizing feature to inoculate at least one center node by blocking any transmission of unwanted information on all links in/out of said center node. Another method for preventing spreading of information or physical traffic may be to inoculate all nodes in a ring of nodes surrounding a center node by blocking any transmission of unwanted information on all links in/out of said nodes. Still another method may be to inoculate at least one bridge link connecting two regions by blocking any transmission of unwanted information on said link.

12 Claims, 11 Drawing Sheets

OTHER PUBLICATIONS

Stang, T., et al., "Archipelago: A Network Security Analysis Tool", Proceedings of the 17th Large Installation Systems Administration Conference, Oct. 2003, pp. 149-158, Usenix Association, San Diego USA.

Canright, G., et al., "Roles in networks", Science of Computer Programming, 2004, pp. 195-214, vol. 53 No. 2, Elsevier Science Publishers B.V., Amsterdam NL.

* cited by examiner

- Connecting center nodes by new node(s) and links (a star topology)

METHODS FOR SPREADING OR PREVENTING SPREADING OF INFORMATION IN A NETWORK

RELATED APPLICATIONS

This application is the U.S. National Phase under 35 U.S.C. §371 of International Application No. PCT/NO06/00259 filed on Jul. 6, 2006, which in turn claims the benefit of Norwegian Application No. 20053330, filed on Jul. 7, 2005, the disclosures of which Applications are incorporated by reference herein.

FIELD OF THE INVENTION

The present invention refers to a set of methods for managing networks (both logical and physical networks), within a number of areas. More particularly the present invention discloses methods for spreading or preventing spreading of information in a network, where the network consists of any number of network nodes connected by links. The inventive methods are based on the method of analyzing networks disclosed in Norwegian patent application NO 2003 5852; the content of this application is hereby incorporated by reference.

BACKGROUND OF THE INVENTION

It is a well known fact of this century that electronic information can spread to many people in a very short time. This fact is good news for some people (spammers, bloggers), but can be rather bad news for those persons responsible for security. The battle against viruses, spam, and other forms of harmful or undesirable, self-propagating information is never-ending.

In the following invention disclosure the problem of the spreading of information has been approached from the direction of network analysis. The present invention includes both methods for helping information to spread more efficiently, and methods for hindering the spreading of unwanted information (e.g., viruses). Much of the background discussion in the present invention disclosure is relevant to either purpose (helping desired information, or hindering unwanted information). In this document we will often use language ('epidemic', 'infection', etc) which is normally appropriate for the description of the spreading of unwanted information. Our convention is however that this epidemic-oriented language refers implicitly to both desired and undesired information, unless otherwise specified; it is used only for convenience.

There are many kinds of models for epidemic spreading. In perhaps the simplest class of such models, one assigns to each node only one of two possible states: 'uninfected' or 'infected'. If you are uninfected ('susceptible'), you are deemed liable to be infected by any infected neighbours. Correspondingly, if you are infected, you remain so for the duration of the experiment—and you remain capable of infecting any or all of your neighbours. Of course, on some appropriate time scale, nodes become 'immune' to the infection: a human develops antibodies, a machine gets antivirus software, the gossip becomes boring, or the innovation becomes outmoded. We focus on a shorter time scale here, so that we can ignore the state of acquired immunity. The technical name for our model of spreading is 'SI', since the nodes have only two states: Susceptible or Infected.

Since spreading takes place over the links of a network, it is clear that the topology of the network can have a profound influence on the spreading process. In particular, we believe that the best understanding of spreading will come from a perspective which is based on a view of the whole network, and on an understanding of that network's structure. In earlier work [1], we have presented an approach to the analysis of network structure which is applicable to any network with symmetric (undirected) links. We also suggested that the analysis should be useful for the understanding of spreading over such a network. Recently [2], we have developed a detailed semi-quantitative theory for how spreading takes place on such networks. The theory is based entirely on our structural analysis. The present invention addresses the question of active design or management of networks for the purpose of controlling (helping or hindering) spreading. Our analysis offers clear suggestions for how to control spreading in both of these senses.

Our approach departs from previous work in that we focus on both the time and spatial progression of the epidemic spreading. We take a spatial resolution which is not microscopic, but rather at the level of 'neighbourhoods'-connected sub-graphs with roughly the same spreading power. More traditional approaches (reviewed in [4]) start from the 'well-mixed' approximation, that every node can infect every other with some probability, at all times. This approach may be said to have no network perspective; or, it may be said to postulate a graph with extremely good mixing-such as a random graph of high degree, or a complete graph. The review of Newman [4] also discusses more recent work, involving a network perspective. All such work is based on whole-graph properties, such as the node degree distribution; also, these approaches have focused on obtaining whole-graph results, either over time [5,6], or focusing especially on the infected fraction at very long times [7]. This latter question is of course only interesting for models more complex than the SI model; and indeed most work is directed towards the behaviour of the SIS model (where nodes lose their infection after some time, and so become Susceptible again), or the SIR model (where nodes, after losing their infection, go through a refractory period). Finally, we note that work analysing only whole-graph properties cannot give the kinds of specific design improvements that are embodied in the present invention.

Brauer [8] has examined the SI model for the case that the nodes (organisms, especially humans) are born and die. Because of the addition of these dynamic features, the steady infection rate is not necessarily 100%. This work uses the well-mixed approximation, which gives rise to coupled ordinary differential equations. Hence it too cannot suggest local, specific design improvements of the type included in the present invention.

A work which is perhaps closest to the present work is that of Wang et al [9]. Their model is SIS, in that nodes can be "cured"; but it is based on a fully microscopic view of the network. In fact, their time evolution operator is the same as that we develop in Ref. [2], with two differences. One is their addition of the "curing" term. This term is simply a multiple of the unit matrix, and so does not change the dominant eigenvector-which remains that of the adjacency matrix A. Because their model is SIS, the long-time infection fraction is not obvious, and must be solved for. The second difference in the time evolution operator of Wang et al is that they neglect the cross terms—i.e. those arising from multiple transmissions to an infected node. This approximation is valid for low infection fraction—while (as we discuss below) it may also be good even as the infection fraction becomes large. Wang et al report simulations which offer some support for this statement.

We emphasize that our work, like that of Wang et al [9], uses the full adjacency matrix A in modelling the time evolution of the infection. Thus we start from a microscopic foundation. However, we will quickly appeal to a 'mesoscopic' picture, in which it is meaningful and useful to speak of neighbourhoods and their properties. As far as we know, our work is unique in this regard. This neighbourhood picture is the basis for the methods (for improving the design of networks) which constitute the present invention.

SUMMARY OF THE INVENTION

It is an object of the present invention to provide a method for improved spreading of information in a network, and a corresponding method with the opposite aim, namely to hinder the spreading of harmful information in a network.

These objects are achieved in the methods disclosed in the appended patent claims. In its first aspect, the present invention provides a method for aiding the spreading of information or physical traffic in a network, said network including a number of network nodes interconnected by links, including:

mapping the topology of the network, computing a value for link strength between the nodes, computing an Eigenvector Centrality index for all nodes, based on said link strength values, identifying nodes which are local maxima of the Eigenvector Centrality index as centre nodes, grouping the nodes into regions surrounding each identified centre node, and with the characterizing feature of connecting at least one node of high Eigenvector Centrality Index in a first region with at least one node of high Eigenvector Centrality Index in a second region.

The second aspect of the invention relates to a method for spreading information or physical traffic in a network, which includes as its characterizing feature to add at least one new node, and connecting at least one existing node of high Eigenvector Centrality Index in each of a first and second region with this said node.

In its third aspect, the invention relates to a method for preventing spreading of information or physical traffic in a network that is characterized in inoculating at least one node of high Eigenvector Centrality Index by blocking any transmission of unwanted information on all links in/out of said node.

In its fourth aspect, the invention relates to a method for preventing spreading of information or physical traffic in a network, said method being characterized in inoculating at least one link of high Eigenvector Centrality Index connecting two regions by blocking any transmission of unwanted information on said link.

BRIEF DESCRIPTION OF FIGURES

In order to make the invention more readily understandable, the invention will now be discussed in detail in reference to the accompanying figures, in which.

DETAILED DESCRIPTION OF THE INVENTION

1. Topography from Topology

An essential aspect of our approach to analysing the structure of a network is to define a measure of centrality for each node in the network. There are in fact many different measures of centrality, most of them coming from social science [10]. Our aim has been to find a measure of centrality which implies well-connectedness. Furthermore, we want a notion of well-connectedness which is not purely local. That is, we want a definition of well-connectedness (centrality) for node i which tells us something about the neighbourhood of node i. We reason that this kind of centrality can be useful for defining well connected clusters in the network, and, based on that, for understanding spreading on the same network.

Our strategy is to choose eigenvector centrality [11] as a useful measure of well-connectedness. Eigenvector centrality (EVC) has the desirable property that—since it depends on the properties of the neighbourhood of a node, and not just of the node itself—it is rather 'smooth' over the graph (or network; we use these terms interchangeably). This is in contrast to the related quantity degree centrality, which simply counts the links leaving a node and so is completely local.

Let us elaborate on this difference. We start with degree centrality. It measures the 'importance' or connectedness of a node simply by counting the node's neighbours. Hence the degree centrality of node i is its node degree $k_i$. Clearly this quantity is completely local: a given node may have a very high degree centrality, and yet all of its neighbours may have a very low degree centrality—there is no correlation between this quantity from one node to its neighbours. Eigenvector centrality is seemingly (at least, in words) only a slight modification. To find a node's EVC, one (again) counts the node's neighbours. but weighting the count by the centrality (EVC) of the neighbours. That is: it's not just how many people you know, but who you know that matters. Mathematically we express this by $$e_i = (const) \times \sum_{j=nn(i)} e_j. \quad (1)$$

Here $e_i$ is the EVC of node i, and j=nn(i) means only sum over the nearest neighbours of i. This definition is clearly circular—my centrality depends on that of my neighbours, but theirs depends also on mine. However Equation (1) is readily solved to find the EVC, as long as one includes the constant (const) in the weighted sum. Furthermore, assuming only that the graph is connected and the links are symmetric, we know that the EVC values will all be positive (although they can be 'practically zero' for very peripheral nodes).

Thus we see that the EVC depends not only on how many neighbours a node has, but also on longer-ranged questions such as how many neighbours a node's neighbours have, etc. In fact, in principle, the EVC of a node depends on the whole graph. More relevant for our purposes, however are two things: (i) the EVC clearly does measure well-connectedness in some kind of non-local fashion, and (ii) because of (i), the EVC values of nodes on any given path through the network cannot vary randomly and arbitrarily. That is, Eq. (1) forces the EVC of any node to be positively coupled to the EVC of that node's neighbours. We like to rephrase this as follows: the EVC is 'smooth' as one moves over the graph. (More mathematical arguments for this 'smoothness' are given in [1]).

The smoothness of the EVC allows one to think in terms of the 'topography' of the graph. That is, if a node has high EVC, its neighbourhood (from smoothness) will also have a somewhat high EVC-so that one can imagine EVC as a smoothly varying 'height', with mountains, valleys, mountaintops, etc. We caution the reader that all standard notions of topography assume that the rippling 'surface' which the topography describes is continuous (and typically two-dimensional, such as the Earth's surface). A graph, on the other hand, is not continuous; nor does it (in general) have a clean correspondence with discrete versions of a d-dimensional space for any d. Hence one must use topographic ideas with care. Nevertheless we will appeal often topographic ideas as aids to the intuition. Our definitions will be inspired by this intuition, but still mathematically precise, and appropriate to the realities of a discrete network.

First we define a 'mountaintop'. This is a point that is higher than all its neighbouring points-a definition which can be applied unchanged to the case of a discrete network. That is, if a node's EVC is higher than that of any of its neighbours (so that it is a local maximum of the EVC), we call that node a Centre. Next, we know that there must be a mountain for each mountaintop. We will call these mountains regions; and they are important entities in our analysis. That is, each node which is not a Centre must either belong to some Centre's mountain (region), or lie on a 'border' between regions. In fact, our preferred definition of region membership has essentially no nodes on borders between regions. Thus our definition of regions promises to give us just what we wanted: a way to break up the network into well connected clusters (the regions).

Here is our preferred definition for region membership: all those nodes for which a steepest-ascent path terminates at the same local maximum of the EVC belong to the same region. That is, a given node can find which region it belongs to by finding its highest neighbour, and asking that highest neighbour to find its highest neighbour, and so on, until the steepest-ascent path terminates at a local maximum of the EVC (i.e., at a Centre). All nodes on that path belong to the region of that Centre. Also, every node will belong to only one Centre, barring the unlikely event that a node has two or more highest neighbours having exactly the same EVC, but belonging to differing regions.

Finally we discuss the idea of 'valleys' between regions. Roughly speaking, a valley is defined topographically by belonging to neither mountainside that it runs between. Hence, with our definition of region membership, essentially no nodes lie in the valleys. Nevertheless it is useful to think about the 'space' between mountains—it is after all this 'space' that connects the regions, and thus plays an important role in spreading. This 'valley space' is however typically composed only of inter-region links. We call these inter-region links bridging links. (And any node which lies precisely on the border may be termed a bridging node.)

Figure 1:
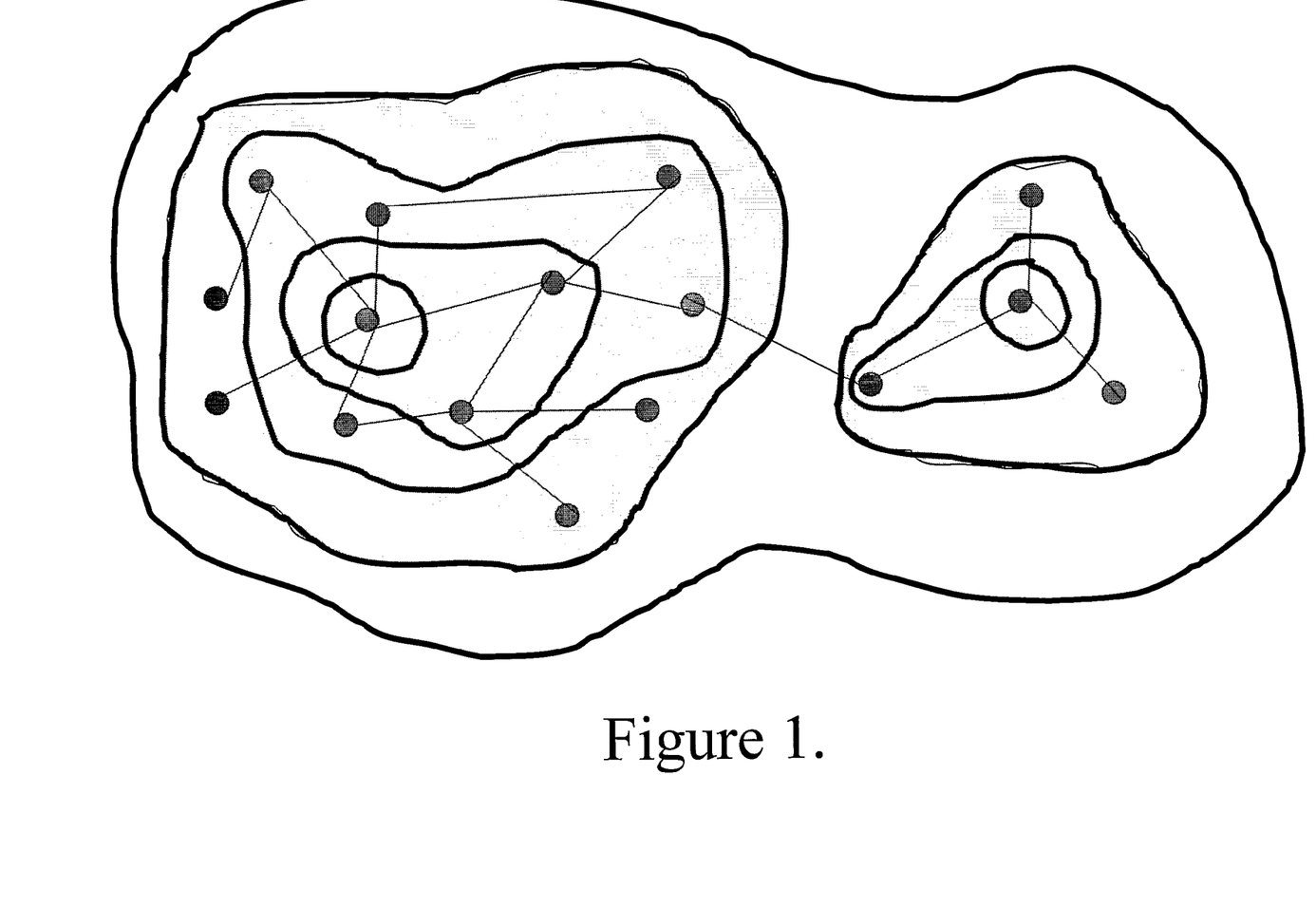
FIG. 1 is a schematic diagram showing the topographic view of a network, as used in the present discussion of the invention, with two 'mountains' (regions).

FIG. 1 offers a pictorial view of these ideas. We show a simple graph with 16 nodes. We draw topographic contours of equal height (EVC). The two Centres, and the mountains (regions) associated with each, are clearly visible in the figure. The figure suggests strongly that the two regions, as defined by our analysis, are better connected internally than they are to one another. Furthermore, from the figure, it is intuitively plausible that spreading (e.g., of a virus) will occur more readily within a region than between regions. Hence, FIG. 1 expresses pictorially the two aims we seek to achieve by using EVC: (i) find the well connected clusters, and (ii) understand spreading.

2 Topography and Epidemic Spreading

In order to understand spreading from a network perspective, we would like somehow to evaluate the nodes in a network in terms of their "spreading power". That is, we know that some nodes play an important role in spreading, while others play a less important role. One need only imagine the extreme case of a star: the centre of the star is absolutely crucial for spreading of infection over the star; while the leaf nodes are entirely unimportant, having only the one aspect (common to every node in any network) that they can be infected.

Clearly, the case of the star topology has an obvious answer to the question of which nodes have an important role in spreading (have high spreading power). The question is then, how can one generate equally meaningful answers for general and complex topologies, for which the answer is not at all obvious? In this section we will propose and develop a qualitative answer to this question.

Our basic assumption (A) is simple, and may be expressed in a single sentence:

Eigenvector Centrality (EVC) is a Good Measure of Spreading Power. (A)

We have tested this idea, via both simulations and theory [2]. Now we will give qualitative arguments which support assumption (A); we will then go on to explore the implications of this assumption. We will see that we can develop a fairly detailed picture of how epidemic spreading occurs over a network, based on (A) and our structural analysis—in short, based on the ideas embodied in FIG. 1.

First we recall that, because a node's EVC depends on that of its neighbours, the EVC values over a network may be thought of as 'smoothly varying' over the network. That is, a node with very high EVC cannot be surrounded by nodes with very low EVC. Of course, it is true that EVC tends to be positively correlated with a simpler measure of centrality, namely the node degree. In fact, one might say that the principal difference between the two measures is that EVC is constrained by its definition to be smooth, while node degree centrality is not [12]. This difference can however be nontrivial. For instance, a node with high degree, surrounded by many leaf nodes, and linked only tenuously to the bulk of a large and well-connected network, will have a low EVC, in spite of its high degree. The point is that EVC is sensitive to properties of neighbourhoods, while node degree is not.

Thus, in short, there are no isolated nodes with high EVC. That is, a node with high EVC is embedded in a neighbourhood with high EVC. (There can however be relatively isolated nodes with low EVC, as this situation is self-consistent. Low-EVC nodes can be isolated in the sense of having very few neighbours; but it is still the case that their neighbours will not have very much higher EVC.) Now if we take our basic assumption (A) to be true, then there are no isolated nodes with high spreading power. Instead, there are neighbourhoods with high spreading power.

We then suppose that an infection has reached a node with modest spreading power. Suppose further that this node is not a local maximum of EVC; instead, it will have a neighbour or neighbours of even higher spreading power. The same comment applies to these neighbours, until one reaches the local maximum of EVC/spreading power.

Now, given that there are neighbourhoods, we can discuss spreading in terms of neighbourhoods rather than in terms of single nodes. It follows from the meaning of spreading power that a neighbourhood characterized by high spreading power will have more rapid spreading than one characterized by low spreading power. Furthermore, we note that these different types of neighbourhoods (high and low) are smoothly joined by areas of intermediate spreading power (and speed).

It follows from all this that, if an infection starts in a neighbourhood of low spreading power, it will tend to spread to a neighbourhood of higher spreading power. That is: spreading is faster towards neighbourhoods of high spreading power, because spreading is faster in such neighbourhoods. Then, upon reaching the neighbourhood of the nearest local maximum of spreading power, the infection rate will also reach a maximum (with respect to time). Finally, as the high neighbourhood saturates, the infection moves back 'downhill', spreading out in all 'directions' from the nearly saturated high neighbourhood, and saturating low neighbourhoods.

We note that this discussion fits naturally with our topographic picture of network topology. Putting the previous paragraph in this language, then, we get the following: infection of a hillside will tend to move uphill, while the infection rate grows with height. The top of the mountain, once reached, is rapidly infected; and the infected top then efficiently infects all of the remaining adjoining hillsides. Finally, and at a lower rate, the foot of the mountain is saturated.

Figure 2:
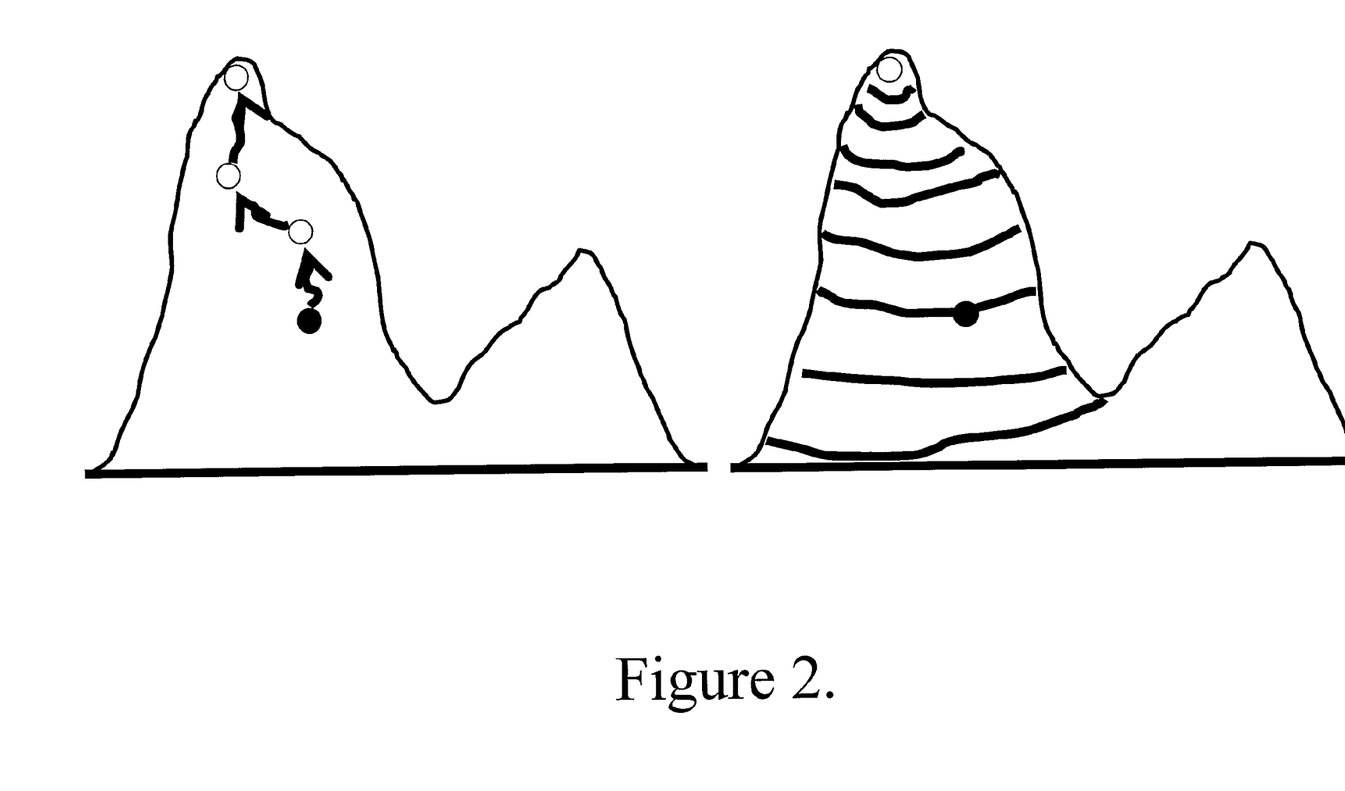
FIG. 2 is a schematic picture showing epidemic spreading in one region. The two regions of FIG. 1 are now viewed from the 'side', as if they were really mountains.

FIG. 2 expresses these ideas pictorially. The figure shows our two-region example of FIG. 1, but viewed from the 'side'—as if each node truly has a height. The initial infection occurs at the black node in the left region. It then spreads primarily uphill, with the rate of spreading increasing with increasing 'height' (=EVC, which tells us, by our assumption, the spreading power). The spreading of the infection reaches a maximum rate when the most central nodes in the region are reached; it then 'takes off', and infects the rest of the region.

We see that this qualitative picture addresses nicely the various stages of the classic S curve of innovation diffusion [13]. The early, flat part of the S is the early infection of a low area; during this period, the infection moves uphill, but slowly. The S curve begins to take off as the infection reaches the higher part of the mountain. Then there is a period of rapid growth while the top of the mountain is saturated, along with the neighbouring hillsides. Finally, the infection rate slows down again, as the remaining uninfected low-lying areas become infected.

Figure 3:
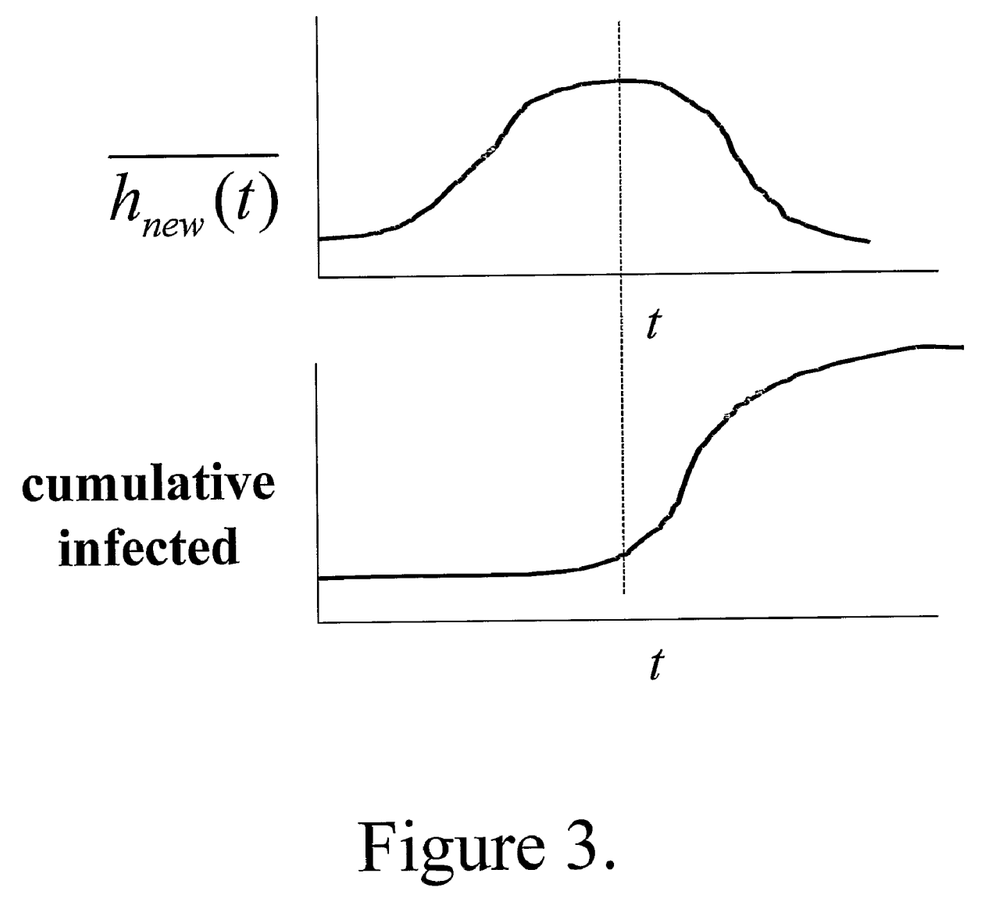
FIG. 3 is a schematic picture of the progress of an infection.

We again summarize these ideas with a figure. FIG. 3 shows a typical S curve for infection, in the case (as we study in this paper) that immunity is not possible. Above this S curve, we plot the expected centrality of the newly infected nodes over time. According to our arguments above, relatively few nodes are infected before the most central node is reached—even as the centrality of the infection front is steadily rising. The takeoff of the infection then roughly coincides with the infection of the most central neighbourhood. Hence, the part of FIG. 3 to the left of the dashed line corresponds to the left half of FIG. 2; similarly, the right-hand parts of the two figures correspond.

One might object that this picture is too simple, in the following sense. Our picture gives an S curve for a single mountain. Yet we know that a network is often composed of several regions (mountains). The question is then, why should such multi-region networks exhibit a single S curve?

Our answer here is that such networks need not necessarily exhibit a single S curve. That is, our arguments predict that each region—defined around a local maximum of the EVC—will have a single S curve. Then—assuming that each node belongs to a single region, as occurs with our preferred rule for region membership—the cumulative infection/infection curve for the whole network is simply the sum of the infection curves for each region. These latter single-region curves will be S curves. Thus, depending on the relative timing of these various single-region curves, the network as a whole may, or may not, exhibit a single S curve. For example, if the initial infection is from a peripheral node which is close to only one region, then that region may take off well before neighbouring regions. On the other hand, if the initial infection is in a valley which adjoins several mountains, then they may all exhibit takeoff roughly simultaneously—with the result being a sum of roughly synchronized S curves, hence a single S curve.

Let us now summarize and enumerate the predictions we take from this qualitative picture.

a. Each region has an S curve.
    b. The number of takeoff/plateau occurrences in the cumulative curve for the whole network may be more than one; but it will not be more than the number of regions in the network.
    c. For each region—assuming (which will be typical) that the initial infection is not a very central node—growth will at first be slow.
    d. For each region (same assumption) initial growth will be towards higher EVC.
    e. For each region, when the infection reaches the neighborhood of high centrality, growth "takes off".
    f. An observable consequence of (e) is then that, for each region, the most central node will be infected at, or after, the takeoff—but not before.
    g. For each region, the final stage of growth (saturation) will be characterized by low centrality.

3 Mathematical Theory

In [2] we have developed a mathematical theory for the qualitative ideas expressed here. We have focused on two aspects there, which we will simply summarize here.

Definition of Spreading Power

The first problem is to try to quantify and make precise our assumption (A). Since (A) relates two quantities-spreading power and EVC—and the latter is precisely defined, the task is then to define the former, and then to seek a relation between the two.

Such a relation is intuitively reasonable. A node which is connected to many well-connected nodes should have higher spreading power, and higher EVC, than a node which is connected to equally many, but poorly connected, nodes. We have offered a precise definition of spreading power in [2]. Our reasoning has two steps: first we define an 'infection coefficient' $C(i,j)$ between any pair of nodes i and j. This is simply a weighted sum of all non-self-retracing paths between i and j, with lower weight given to longer paths. Thus many short paths between two nodes gives them a high infection coefficient. Our definition is symmetric, so that $C(i,j)=C(j,i)$.

Next we define the spreading power of node i to be simply the sum over all other nodes j of its infection coefficient $C(i,j)$ with respect to j. As long as the graph is connected, every node will have a nonzero $C(i,j)$ with every other, thus contributing to the sum. Hence each node has the same number of terms in the sum; but the nodes with many large infection coefficients will of course get a higher spreading power.

We then show in [2] that one can make a strong connection between this definition of spreading power and the EVC, if one can ignore the restriction to non-self-retracing paths in the definition. We restrict the sum to non-self-retracing paths because self-retracing paths do not contribute to infection in the SI case. This restriction makes the obtaining of analytical results harder.

Mathematical Theory of SI Spreading

We have given in [2] exact equations for the propagation of an infection, for arbitrary starting node, in the SI case. These equations are stochastic—expressed in terms of probabilities—due to the probabilistic model for spreading over links. They are not generally solvable, even in the deterministic case when p=1. The problem in the latter case is again the need to exclude non-self-retracing paths. However we have performed an expansion in powers of p for the time evolution of the infection probability vector. This expansion shows that the dominant terms are those obtained by naively applying the adjacency matrix (i.e., ignoring self-retracing paths because they are longer, hence higher order in p). The connection to EVC is then made: naively applying the adjacency matrix gives weights (infection probabilities) which approach a distribution proportional to the EVC. Hence we get some confirmation for our claim that, in the initial stages of an infection, the front moves towards higher EVC.

4 Design and Improvement of Networks

In this section we go beyond the problem of analysis, and address the problem of design of networks [14]. Our ideas have some clear implications for design—both towards the aim of preventing the spreading of harmful information (such as viruses) and towards the aim of helping spreading—in each case, by modifying the topology of a given network.

Measures to Improve Spreading

Figure 4:
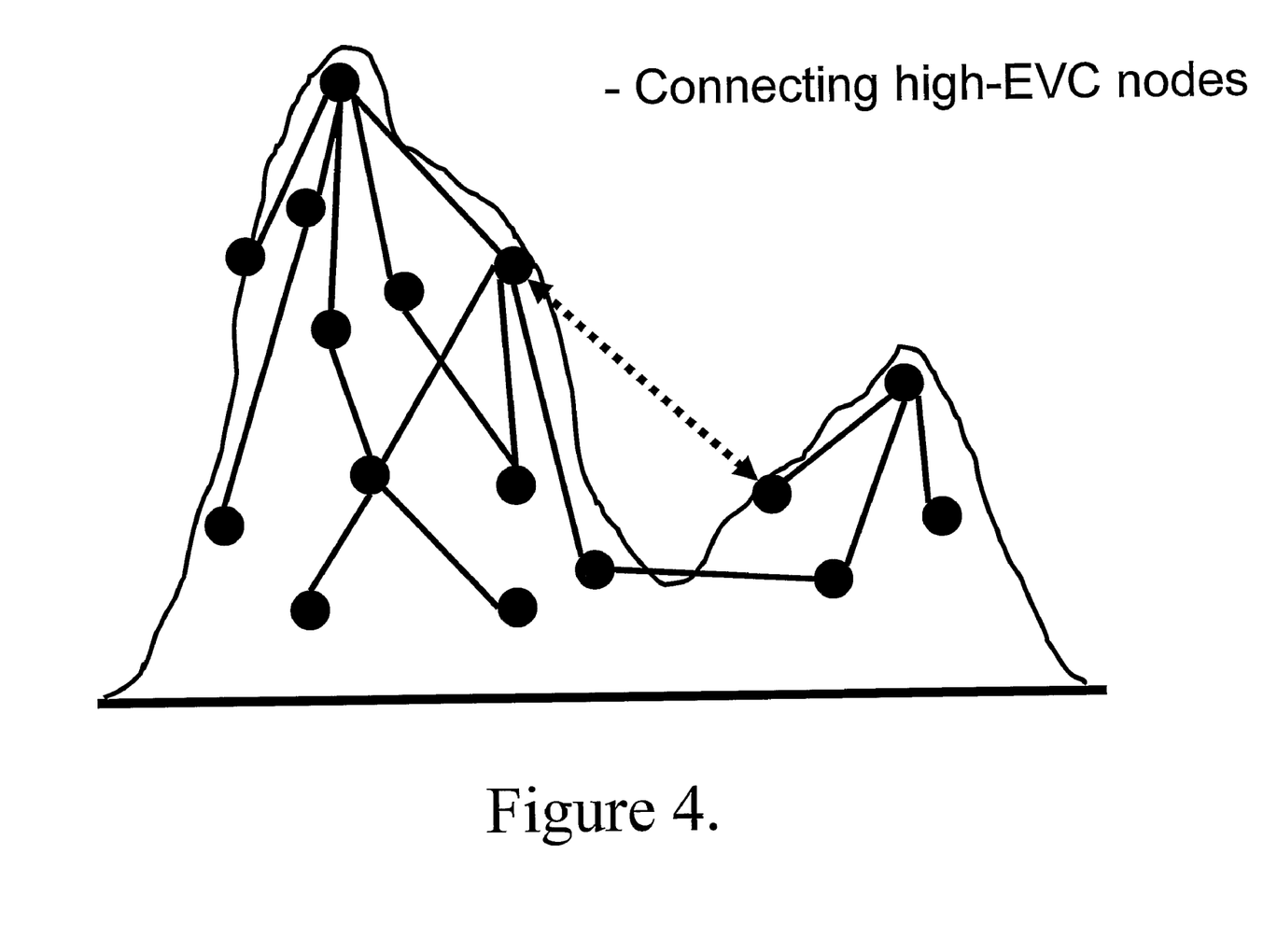
FIG. 4 is a schematic picture of connecting two high-EVC nodes in different regions with a link.
Figure 5:
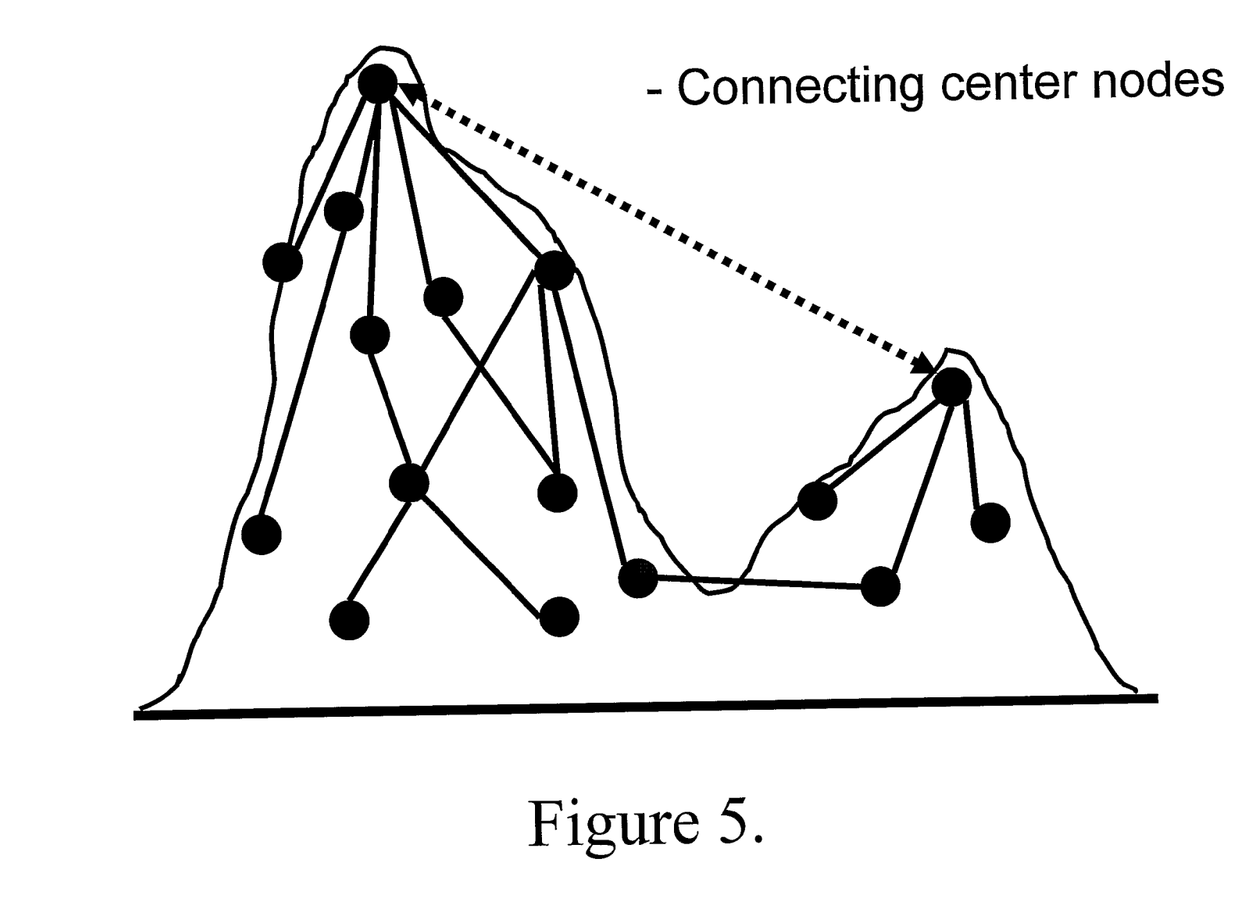
FIG. 5 is a schematic picture of connecting centres with a link.

We frame our ideas in terms of our topographic picture. Now we suppose that we wish to design, or modify the design of, a network, so as to improve its efficiency with respect to spreading. It is reasonable, based on our picture, to assume that a single region is the optimal topology for efficient spreading. Hence we include, in the present invention, four ideas which are expected to improve information flow in a network, by modifying a given (multi-region) network topology to make it more like a single region:

1. One can add more bridge links between the regions. Links between nodes with high EVC in each region are expected to be most effective. See FIG. 4.
2. As an extreme case of 1, one can connect the Centres of the regions. See FIG. 5.
3. One can connect a subset of nodes from different regions by a relaying star node. See FIG. 10B.
4. One can connect all, or some, of the centre nodes by a relaying star node. See FIG. 11B.

Figure 11:
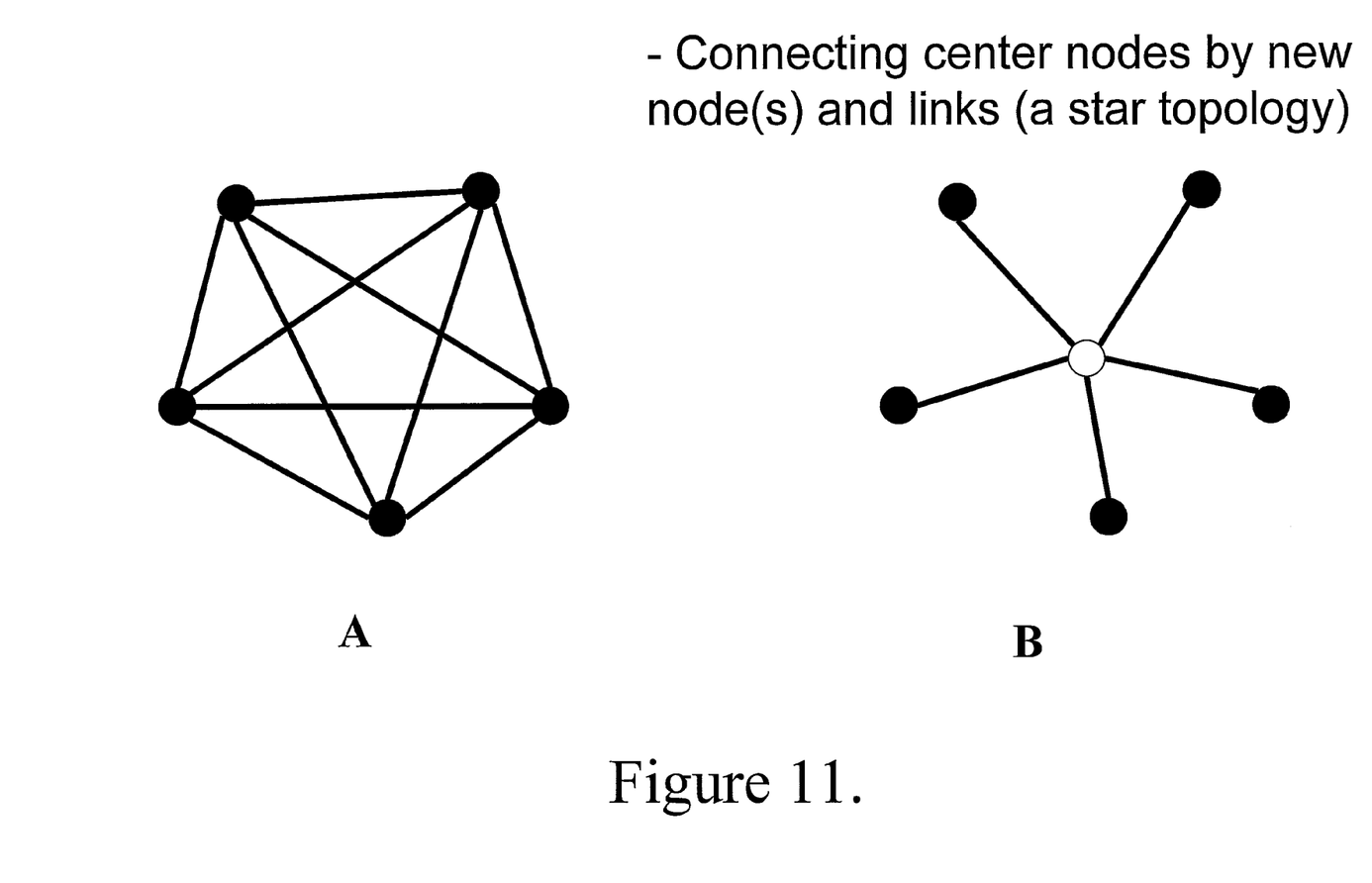
FIG. 11 is a schematic picture of two different ways of connecting a set of centre nodes. In A, all the centre nodes are connected to all other centre nodes. In B, an extra node is inserted, and this new node has connections to all or a subset of the centre nodes. The new node has a star topology.

Idea 2 is a "greedy" version of idea 1. In fact, the greediest version of idea 2 is to connect all Centres to all, thus forming a complete sub-graph among the Centres. A complete sub-graph among 5 Centres is shown in FIG. 11A. An alternative to this design is to insert a new star node (shown in white in FIG. 11B), which is connected to all the centre nodes by just one link to each. In some situations, where physically laying down new links is costly in terms of scarce resources, and adding new nodes is feasible, this star design can be more attractive than the complete sub-graph option. When n Centres are to be connected, the star design adds just n new links and one new node, whereas the complete subgraph will add $n(n-1)/2$ new links. Combinations of these two approaches are also possible; one subset of the centres can be connected as a complete subgraph, whereas a star node can connect another subset.

Figure 10:
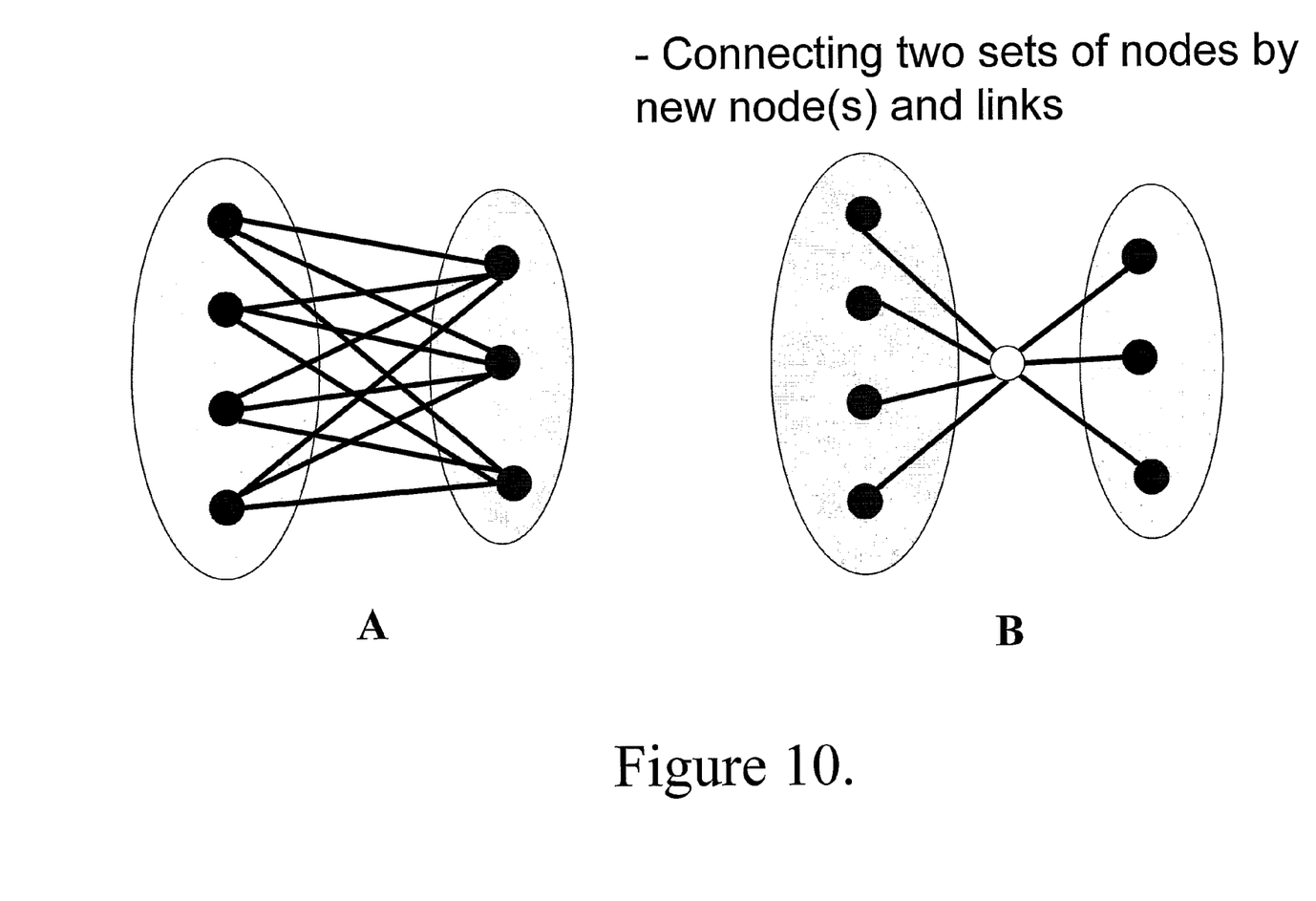
FIG. 10 is a schematic picture of two different ways of connecting two subsets of nodes. In A, all the nodes in the one set are connected to all the nodes in the other set. In B, an extra node is inserted, and this new node has connections to all or some of the nodes in each subset of nodes. The new node has a star topology.

However, such greedy approaches may in practice be difficult or impossible. There remain then the general ideas 1 and 3 of building more bridges between the regions. Here we see however no reason for not taking the greediest practical version of this idea. That is: build the bridges between nodes of high centrality on both sides-preferably, as high as possible. Our analysis strongly suggests that this is the best strategy for modifying topology so as to help spreading. Choosing subsets of nodes of high EVC score in each region, and then combining these subsets, can also be done, as shown in FIG. 10A. Again, in cases where one wants to minimize the number of new links added to the network, adding a new star node in between the two subsets of nodes can be a viable solution. This is shown in FIG. 10B. Connecting all the nodes in one subset with all the nodes in the other subset will require k*g new links, where k and g are the number of nodes in each subset. In the star-node approach the number of added links can be considerably less: only k+g. Hence, the advantage of the relaying star-node approach should be clear.

We note that the greediest strategy is almost guaranteed to give a single-region topology (and therefore efficient information spreading) as a result. Our reasoning is simple. First, the existing Centres cannot all be Centres after they are all connected one to another-because two adjacent nodes cannot both be local maxima of the EVC (or of anything else). Therefore, either new Centres turn up among the remaining nodes as a result of the topology modification, or only one Centre survives the modification. In the latter case we have one region. The former case, we argue, is unlikely: we note that the EVC of the existing Centres is (plausibly) strengthened (raised) by the modification more than the EVC of other nodes. That is, we believe that connecting existing centres in a complete sub-graph will 'lift them up' with respect to the other nodes, as well as bringing them closer together. If this 'lifting' idea is correct, then we end up with a single Centre and a single region.

Measures to Prevent Spreading

Figure 6:
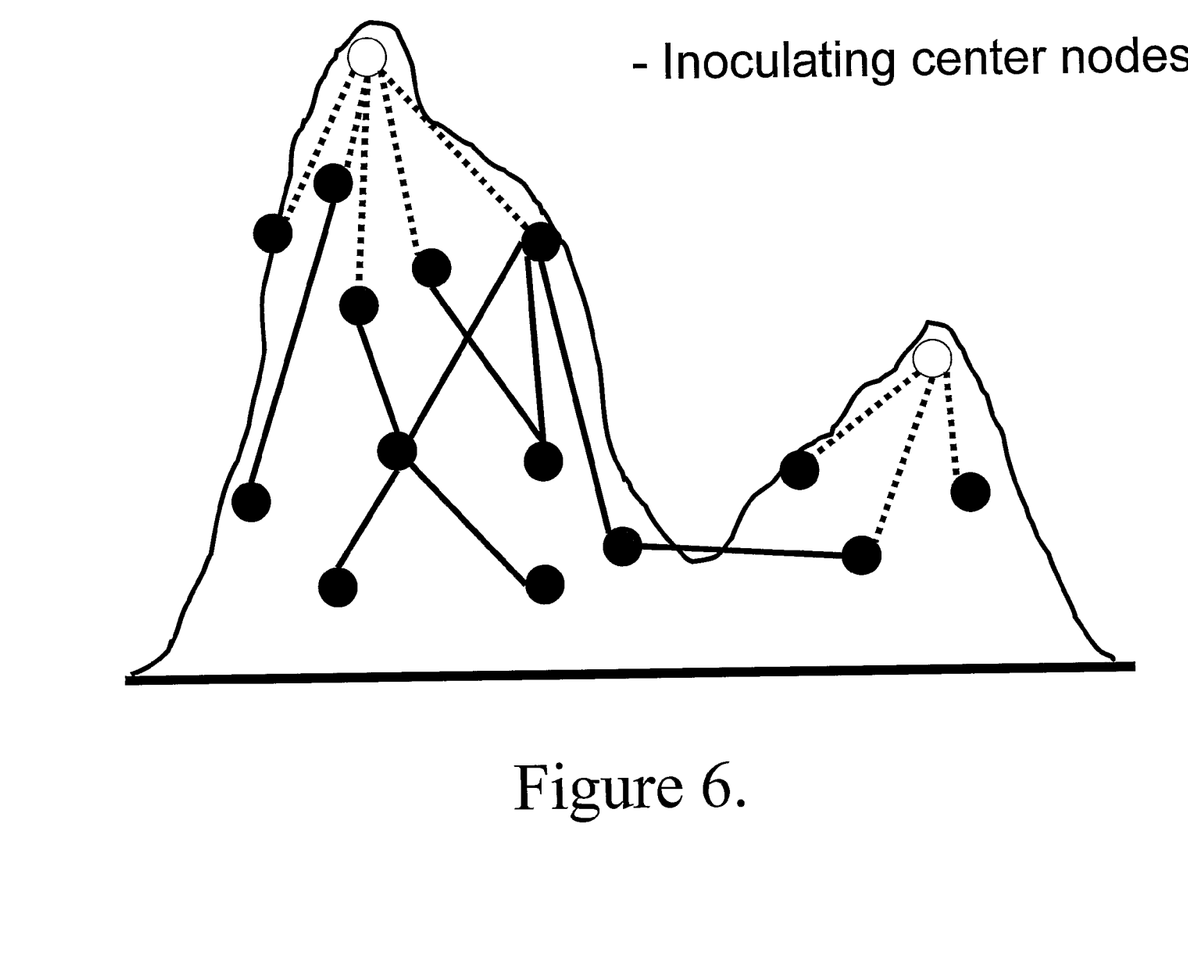
FIG. 6 is a schematic picture of the procedure of inoculating the centre nodes in regions.
Figure 7:
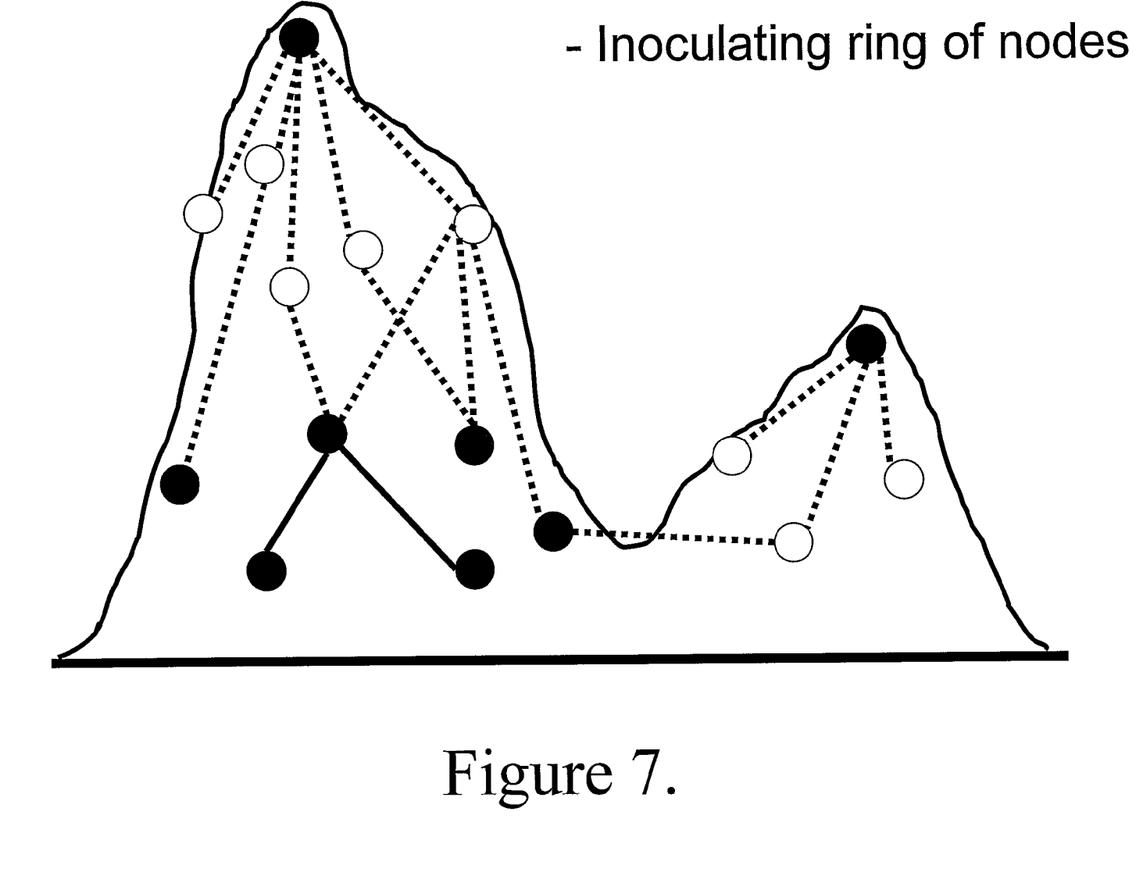
FIG. 7 is a schematic picture of the procedure of inoculating a ring (centred at the region centre node) of nodes one hop away from the region centres.

Now we address the problem of designing, or redesigning, a network topology so as to hinder spreading. Here the problem is more complicated than in the helping case. The reason for this is that we build networks in order to support and facilitate communication. Hence we cannot simply seek the extreme, 'perfect' solution-because the ideal solution for hindering spreading is one region per node, i.e., disconnect all nodes from all others! Instead we must consider incremental changes to a given network. We consider two types of 'inoculation' strategies: inoculating nodes (which is equivalent to removing them, as far as spreading is concerned), or inoculating links (which is also equivalent to removing them). Again we include in the present invention a list of ideas, now useful for hindering spreading:

1. One can inoculate the Centres (see FIG. 6)—along with, perhaps, a small neighbourhood around them.
2. One can instead find a ring of nodes surrounding each Centre (at a radius of perhaps two or three hops) and inoculate the ring. In FIG. 7, a ring of nodes at one hop from each Centre is inoculated.
3. One can inoculate bridge links. See FIG. 9.
4. One can inoculate nodes at the ends of bridge links. See FIG. 8.

Figure 8:
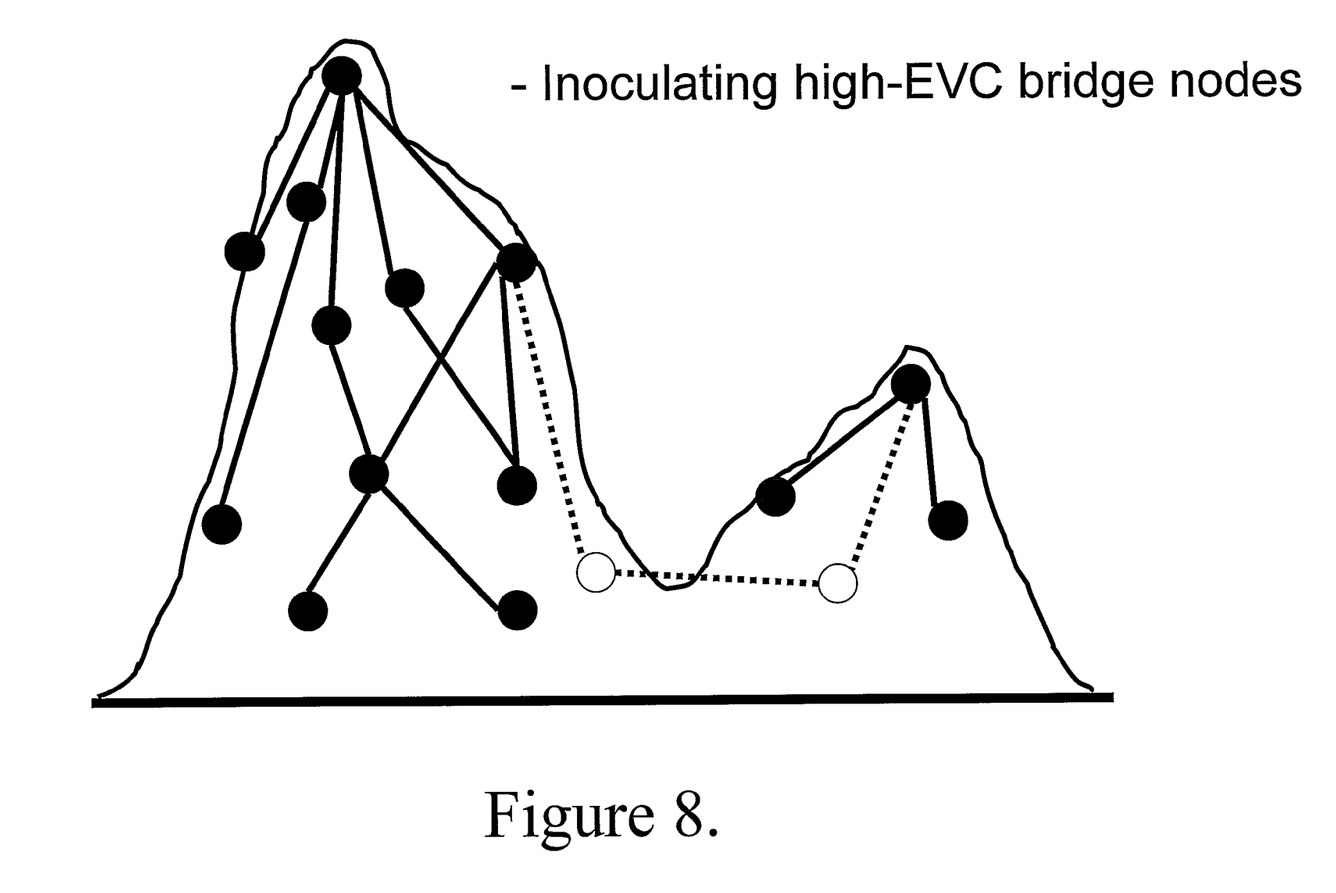
FIG. 8 is a schematic picture of the procedure of inoculating high-EVC bridge nodes.
Figure 9:
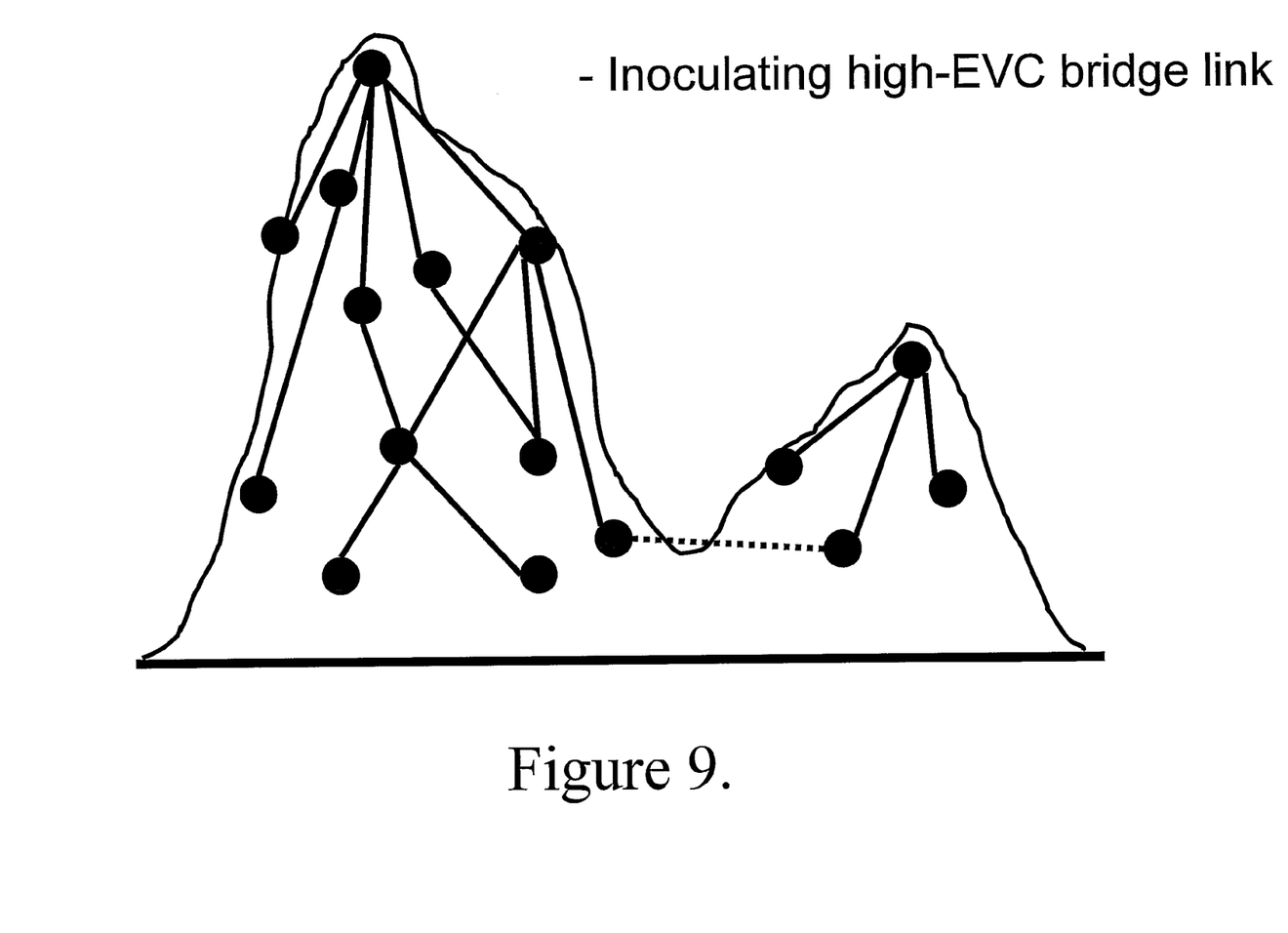
FIG. 9 is a schematic picture of the procedure of inoculating a high-EVC bridge link.

We note that ideas 1 and 2 are applicable even in the case that only a single region is present. Ideas 3 and 4 may be used when multiple regions are found. Note that inoculating a bridge link (idea 3) is not the same as inoculating the two nodes which the link joins (idea 4): inoculating a node effectively removes that node and all links connected to it, while inoculating a link removes only that link. In FIG. 8, the two nodes at the ends of the bridge link are inoculated, while in FIG. 9, only the bridge link itself is inoculated.

Also, with link inoculation, one has the same considerations as with link addition-namely, the height of the link matters. We define the "link EVC" to be the arithmetic mean of the EVC values of the nodes on the ends of the link. Ideas 3 and 4 are then almost certainly most effective if the bridging links chosen for inoculation have a relatively high link EVC.

Inoculating a link means removing the link. And "removing" means blocking any and all communication over the link. Now, given this definition, we can say that inoculating a node means inoculating ALL links connected to that node. In this way, no communication to or from the inoculated node is possible. This is equivalent to "removing the node from the graph". For our purposes, it is not necessary to shut down a node in order to inoculate it. One must simply close off all communication to & from the node.

Another definition of inoculation is possible. If it is possible to detect and block the unwanted information, and thereby to filter the communication over links in some way, then we need not close off ALL communication on a link in order to inoculate the link. That is, if we can detect the unwanted, harmful communication (e.g., a virus), then it is sufficient to block only THAT form for communication, and allow other communications through. Inoculation of a link may then be defined as: Blocking any transmission of "unwanted" information over the link. Then inoculating a node can be defined as inoculating all links connected to the node (as before).

REFERENCES

[1] Geoffrey Canright and Kenth Engø-Monsen, "Roles in Networks". Science of Computer Programming, 53 (2004) 195-214.
[2] Geoffrey Canright and Kenth Engø-Monsen, "Spreading on networks: a topographic view", submitted to European Conference on Complex Systems (ECCS05).
[3] Geoffrey Canright, Kenth Engø-Monsen, Asmund Weltzien, and Fahimeh Pourbayat, "Diffusion in social networks and disruptive innovations". IADIS e-Commerce 2004 proceedings. Lisbon 2004.
[4] M. E. J. Newman, "The structure and function of complex networks". SIAM Review, 45 (2003), 167-256.
[5] Romualdo Pastor-Satorras and Alessandro Vespignani, "Epidemic Spreading in Scale-Free Networks". Phys. Rev. Lett 86 (2001), 3200-3203.
[6] Romualdo Pastor-Satorras and Alessandro Vespignani, "Epidemic dynamics and endemic states in complex networks". Phys. Rev. E 63, 066117 (2001).
[7] M. E. J. Newman, "Spread of epidemic disease on networks". Phys. Rev. E 66, 016128 (2002).
[8] Fred Brauer, "A model for an SI disease in an age-structured population". Discrete and Continuous Dynamical Systems B2 (2002), 257-264.
[9] Yang Wang, Deepayan Chakrabarti, Chenxi Wang, and Christos Faloutsos, "Epidemic spreading in real networks: an eigenvalue viewpoint". Proceedings, $22^{nd}$ Symposium on Reliable Distributed Systems (SRDS 2003), 25-34.
[10] A good introduction to many of these definitions may be found in: http://www.analytictech.com/networks/centrali.htm
[11] P. Bonacich, "Factoring and weighting approaches to status scores and clique identification". Journal of Mathematical Sociology, 2 (1972), 113-120.
[12] The star illustrates this difference to some extent. Suppose the graph is a star with n 'leaves'—that is, a graph with one node in the center, linked to each of n other nodes, each of which have no neighbour other than the center node. The degree centrality of the center is of course n, and that of the leaves is 1. The EVC of the center is however only $\sqrt{n}$ larger than the EVC of the leaves. Hence using EVC-which makes the centrality of the center dependent on that of its neighbors-gives a reduction (by a factor $1/\sqrt{n}$) in the (potentially large) difference in degree centrality between leaves and center.
[13] E. M. Rogers, *Diffusion of Innovations*, $3^{rd}$ ed. Free Press, New York (1983).
[14] For a discussion of closely related ideas, see: M. Burgess, G. Canright, and K. Engø. "A graph theoretical model of computer security: from file access to social engineering". International Journal of Information Security, Volume 3, Number 2, November 2004, pages 70-85.

The invention claimed is:

1. A method of spreading information in a network, said network including a plurality of network nodes interconnected by links, said method including steps of:
    (a) mapping a topology of said plurality of nodes of said network;
    (b) computing one or more values of link strength between said nodes;
    (c) computing, via a computer, Eigenvector Centrality Indexes for said plurality of nodes, said Indexes being computed from said one or more values of link strength;
    (d) identifying nodes which are local maxima of said Indexes, said identified nodes being denoted to be centre nodes;
    (e) identifying regions associated with said centre nodes, and associating said centre nodes with corresponding network nodes in their corresponding regions,
    characterized in that said method includes further steps of:
    (f) identifying for each region corresponding nodes into first and second groups of nodes, said first group of nodes including said centre node of said region, and said second group of nodes having Eigenvector Centrality Indexes less than nodes included in said first group; and
    (g) connecting at least one network node of a first group of a first region to at least one network node of a first group of a second region.

2. A method as claimed in claim 1, characterized in that said method includes a step of connecting the centre node of said first region with all or a subset of the centre nodes of said multiple regions into a complete graph.

3. A method as claimed in claim 1, characterized in that said method includes a step of connecting all or a subset of EVC nodes from said first group of said first region, with all or a subset of EVC nodes of the first group of said second region.

4. A method of spreading information in a network, said network including a plurality of network nodes interconnected by links, said method including steps of:
(a) mapping a topology of said plurality of nodes of said network;
(b) computing one or more values of link strength between said nodes;
(c) computing, via a computer, Eigenvector Centrality Indexes for said plurality of nodes, said Indexes being computed from said one or more values of link strength;
(d) identifying nodes which are local maxima of said Indexes, said identified nodes being denoted to be centre nodes;
(e) identifying regions associated with said centre nodes, and associating said centre nodes with corresponding network nodes in their corresponding regions,
characterized in that said method includes further steps of:
(f) identifying for each region corresponding nodes into first and second groups of nodes, said first group of nodes including said centre node of said region, and said second group of nodes having Eigenvector Centrality Indexes less than nodes included in said first group; and
(g) adding at least one new node, and connecting at least one existing node from the first group in first and second regions with said at least one new node.

5. A method as claimed in claim 4,
characterized in said method includes a step of connecting with a direct link all or a subset of the centre nodes of said multiple regions to said new node, thus forming a star graph.

6. A method as claimed in claim 4,
characterized in said method includes a step of connecting all or a subset of EVC nodes of said first group of said first and second regions to said new node, thus forming a star graph.

7. A method of preventing spreading of information in a network, said network including a plurality of network nodes interconnected by links, said method including steps of:
(a) mapping a topology of said plurality of nodes of said network;
(b) computing one or more values of link strength between said nodes;
(c) computing, via a computer, Eigenvector Centrality Indexes for said plurality of nodes, said Indexes being computed from said one or more values of link strength;
(d) identifying nodes which are local maxima of said Indexes, said identified nodes being denoted to be centre nodes;
(e) identifying regions associated with said centre nodes, and associating said centre nodes with corresponding network nodes in their corresponding regions,
characterized in that said method includes further steps of:
(f) identifying for each region corresponding nodes into first and second groups of nodes, said first group of nodes including said centre node of said region, and said second group of nodes having Eigenvector Centrality Indexes less than nodes included in said first group; and
(g) inoculating at least one node of Eigenvector Centrality Index from said first group by blocking any transmission of unwanted information on all links in/out of said node.

8. A method as claimed in claim 7,
characterized in that said method includes a step of inoculating all or a subset of the centre nodes.

9. A method as claimed in claim 7,
characterized in that said method includes a step of inoculating a ring of nodes at a distance of hops of at least one hop away from the said centre node.

10. A method as claimed in claim 7,
characterized in that said method includes a step of inoculating all or a subset of bridge nodes of said first groups of said regions.

11. A method for preventing spreading of information in a network, said network including a plurality of network nodes interconnected by links, said method including steps of:
(a) mapping a topology of said plurality of nodes of said network;
(b) computing one or more values of link strength between said nodes;
(c) computing, via a computer, Eigenvector Centrality Indexes for said plurality of nodes, said Indexes being computed from said one or more values of link strength;
(d) identifying nodes which are local maxima of said Indexes, said identified nodes being denoted to be centre nodes;
(e) identifying regions associated with said centre nodes, and associating said centre nodes with corresponding network nodes in their corresponding regions,
characterized in that said method includes further steps of:
(f) identifying for each region corresponding nodes into first and second groups of nodes, said first group of nodes including said centre node of said region, and said second group of nodes having Eigenvector Centrality Indexes less than nodes included in said first group;
(g) identifying links which connect two regions as bridging links;
(h) identifying bridging links with Eigenvector Centrality nodes from first groups at each end of said links as high Eigenvector Centrality links; and
(i) inoculating at least one high Eigenvector Centrality link by blocking any transmission of unwanted information on said Eigenvector Centrality link.

12. A method as claimed in claim 11,
characterized in that said method includes a step of inoculating all or a subset of bridge links of high link centrality.

* * * * *